United States Patent
Edlis et al.

(10) Patent No.: US 7,085,308 B2
(45) Date of Patent: Aug. 1, 2006

(54) SEARCHING IN DUAL-MODE COMMUNICATIONS SYSTEM

(75) Inventors: Ofir Edlis, Modiin (IL); Roni Shoev, Rishon LeZion (IL)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 09/780,470

(22) Filed: Feb. 12, 2001

(65) Prior Publication Data

US 2001/0028674 A1 Oct. 11, 2001

(30) Foreign Application Priority Data

Feb. 13, 2000 (IL) .................................. 134512

(51) Int. Cl.
*H04B 1/69* (2006.01)
*H04B 1/713* (2006.01)
*H04B 7/216* (2006.01)
*H04B 1/40* (2006.01)

(52) U.S. Cl. ........................ 375/142; 375/130; 370/342; 455/86

(58) Field of Classification Search ................ 375/142, 375/267, 146; 370/342, 441; 455/86
See application file for complete search history.

(56) References Cited

U.S. PATENT DOCUMENTS

| | | | |
|---|---|---|---|
| 3,806,663 A | | 4/1974 | Peek et al. |
| 4,839,639 A | | 6/1989 | Sato et al. |
| 5,152,006 A | | 9/1992 | Klaus |
| 5,252,963 A | | 10/1993 | Snowden et al. |
| 5,265,270 A | | 11/1993 | Stengel et al. |
| 5,361,276 A | | 11/1994 | Subramanian |
| 5,392,287 A | | 2/1995 | Tiedemann et al. |
| 5,448,774 A | | 9/1995 | Yokozaki et al. |
| 5,471,655 A | | 11/1995 | Kivari |
| 5,551,078 A | | 8/1996 | Connell et al. |
| 5,627,882 A | | 5/1997 | Chien et al. |
| 5,678,227 A | | 10/1997 | Connell et al. |
| 5,708,971 A | | 1/1998 | Dent |
| 5,737,322 A | | 4/1998 | Burbidge et al. |
| 5,740,517 A | | 4/1998 | Aoshima |
| 5,754,583 A | | 5/1998 | Eberhardt et al. |
| 5,758,266 A | * | 5/1998 | Kornfeld et al. .............. 455/86 |
| 5,822,689 A | | 10/1998 | Hwang |
| 5,936,950 A | * | 8/1999 | Hottinen ..................... 370/342 |
| 5,950,131 A | * | 9/1999 | Vilmur ....................... 455/434 |
| 5,960,039 A | | 9/1999 | Martin et al. |
| 6,088,576 A | | 7/2000 | Sone |
| 6,091,703 A | | 7/2000 | Saunders et al. |
| 6,108,324 A | | 8/2000 | Brown et al. |

(Continued)

FOREIGN PATENT DOCUMENTS

WO      WO 98/44670       10/1998

OTHER PUBLICATIONS

U.S. Appl. No. 09/371,276, filed Aug. 10, 1999, Rainish et al.
U.S. Appl. No. 09/778,818, filed Feb. 8, 2001, Edlis et al.
U.S. Appl. No. 10/197,212, filed Jul. 18, 2002, Rainish et al.
David M. DiCarlo and Charles L. Weber, "Multiple Dwell Serial Search: Performance and Application to Direct Sequence Code Acquisition", IEEE Transaction on Communications, vol. COM-31, pp. 650–659, No. 5, May 1983.

*Primary Examiner*—Stephen Chin
*Assistant Examiner*—Cicely Ware
(74) *Attorney, Agent, or Firm*—Pearl Cohen Zedek Latzer, LLP

(57) ABSTRACT

A method including searching for a pilot signal of a second communications system while retaining the connection with a first communications system.

19 Claims, 7 Drawing Sheets

U.S. PATENT DOCUMENTS

| | | | |
|---|---|---|---|
| 6,115,388 A | * | 9/2000 | Chinitz et al. ............... 370/441 |
| 6,125,137 A | | 9/2000 | Wang et al. |
| 6,134,440 A | | 10/2000 | Black |
| 6,208,837 B1 | | 3/2001 | Koh et al. |
| 6,223,047 B1 | | 4/2001 | Ericsson |
| 6,263,448 B1 | | 7/2001 | Tsern et al. |
| 6,289,228 B1 | * | 9/2001 | Rotstein et al. ............. 455/574 |
| 6,453,181 B1 | | 9/2002 | Challa et al. |
| 6,584,313 B1 | | 6/2003 | Butler et al. |
| 6,606,490 B1 | * | 8/2003 | Rainish et al. ........... 340/10.34 |
| 6,608,858 B1 | | 8/2003 | Sih et al. |
| 6,728,300 B1 | | 4/2004 | Sarkar et al. |
| 6,804,503 B1 | | 10/2004 | Shohara et al. |
| 2003/0076816 A1 | | 4/2003 | Naranjo et al. |
| 2003/0189947 A1 | | 10/2003 | Maged |

* cited by examiner

SEARCHING IN DUAL-MODE COMMUNICATIONS SYSTEM

CROSS REFERENCE TO RELATED APPLICATIONS

This application claims priority from Israeli Patent Application No. 134512, filed Feb. 13, 2000, which is hereby incorporated by reference.

FIELD OF THE INVENTION

The present invention relates to wireless communication systems, in general, and particularly to dual-mode transceivers.

BACKGROUND OF THE INVENTION

A dual-mode transceiver, which may be a mobile station, may support and switch between two different types of wireless communications systems. When a mobile station travels outside the boundary of the communications system with which it is currently communicating, it may be desirable to maintain the communication link by transferring the call to a neighboring system, if one exists. The current and neighboring communications systems may use any wireless technology, for example, Code Division Multiple Access (CDMA), which is a type of spread spectrum communications protocol, Advanced Mobile Phone Service (AMPS), Frequency Division Multiple Access (FDMA), Time Division Multiple Access (TDMA), or Global System for Mobile communication (GSM). If the neighboring system uses CDMA on the same frequency band as the current system, a soft handoff may be performed, that is, the handoff is performed without first breaking the link with the first system.

However, if the mobile station is traveling from a region serviced by a CDMA system to a region serviced by a system employing a different communications protocol, such as AMPS, or vice versa, then a soft handoff cannot be performed. In such a case, the communication link may be transferred through a hard handoff, wherein the current connection is broken before a new one is made. In the example of a hard handoff from AMPS to CDMA, this requires breaking the link to AMPS, going to another frequency, searching for pseudorandom noise (PN) code signals, returning to the original frequency and reestablishing the link. In general, prior art real-time processing techniques are impractical, if not totally unsuitable, for such a hard handoff. Due to the time-consuming and power-consuming calculations that are part of the processing, reestablishment of the link to AMPS is either detrimentally impaired or altogether impossible, and a dual mode hard handoff cannot be effected between AMPS and CDMA.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
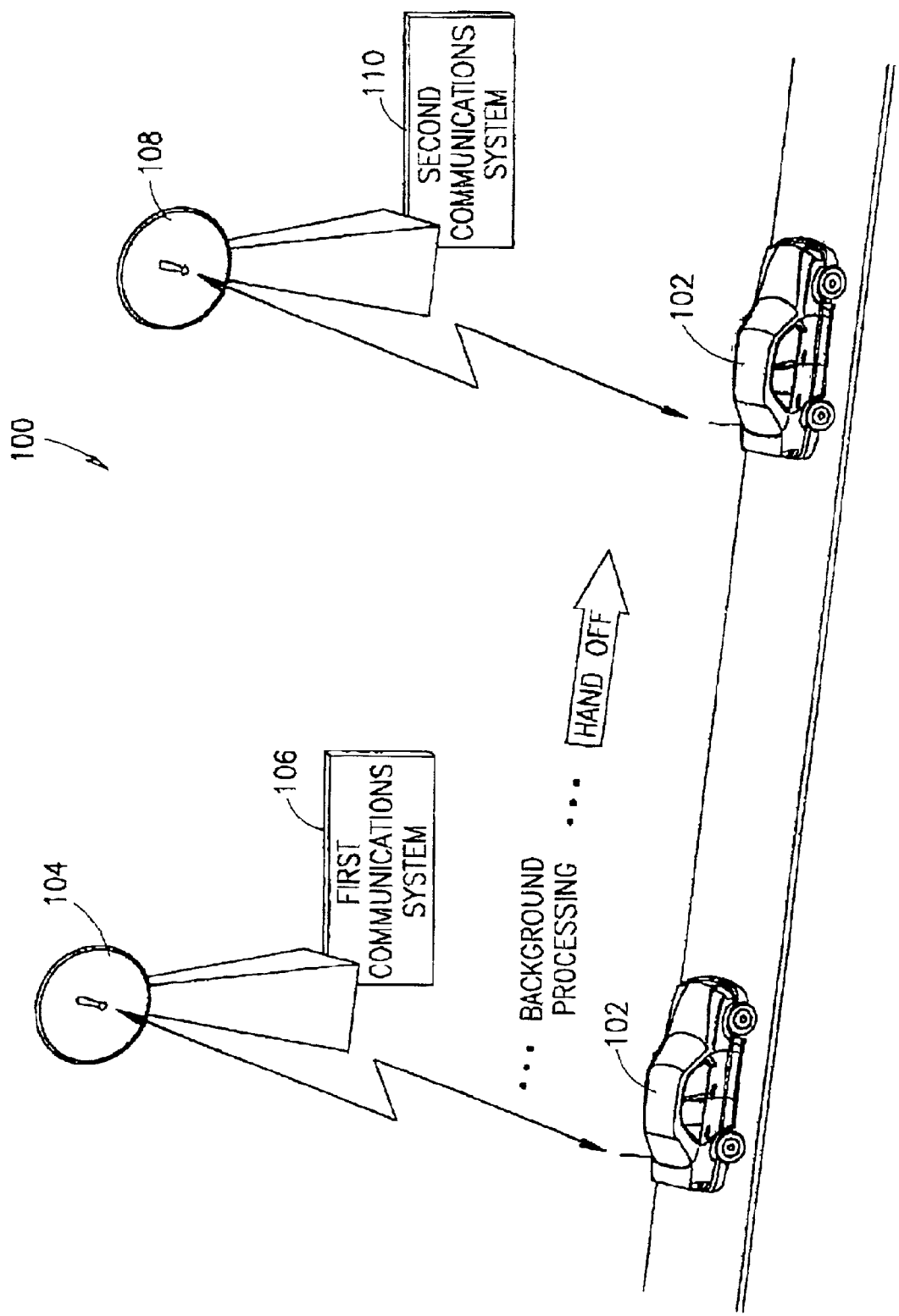
FIG. 1 is a pictorial illustration of a method for operating a dual-mode communications system in accordance with an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the at.

An algorithm is here, and generally, considered to be a self consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Reference is now made to FIG. 1, which illustrates a dual-mode communications system 100, in accordance with an embodiment of the invention, Dual-mode communications system 100 may comprise a mobile station 102 adapted to communicate with a base station 104 of a first communications system 106, such as AMPS, and with a base station 108 of a second communications system 110, such as CDMA. It is appreciated that other kinds of communications systems may also be employed in carrying out the invention, such as, but not limited to, AMPS, FDMA, TDMA or GSM. Mobile station 102 is also referred to as a dual mode transceiver, which comprises a receive path for receiving and processing communications signals from the first communications system 106 and the second communications system 110, such a receive path being described hereinbelow with reference to FIGS. 3 and 4. Transmission from the base station to the mobile station is referred to as the downlink, whereas transmission from the mobile station to the base station is referred to as the uplink.

Figure 2:
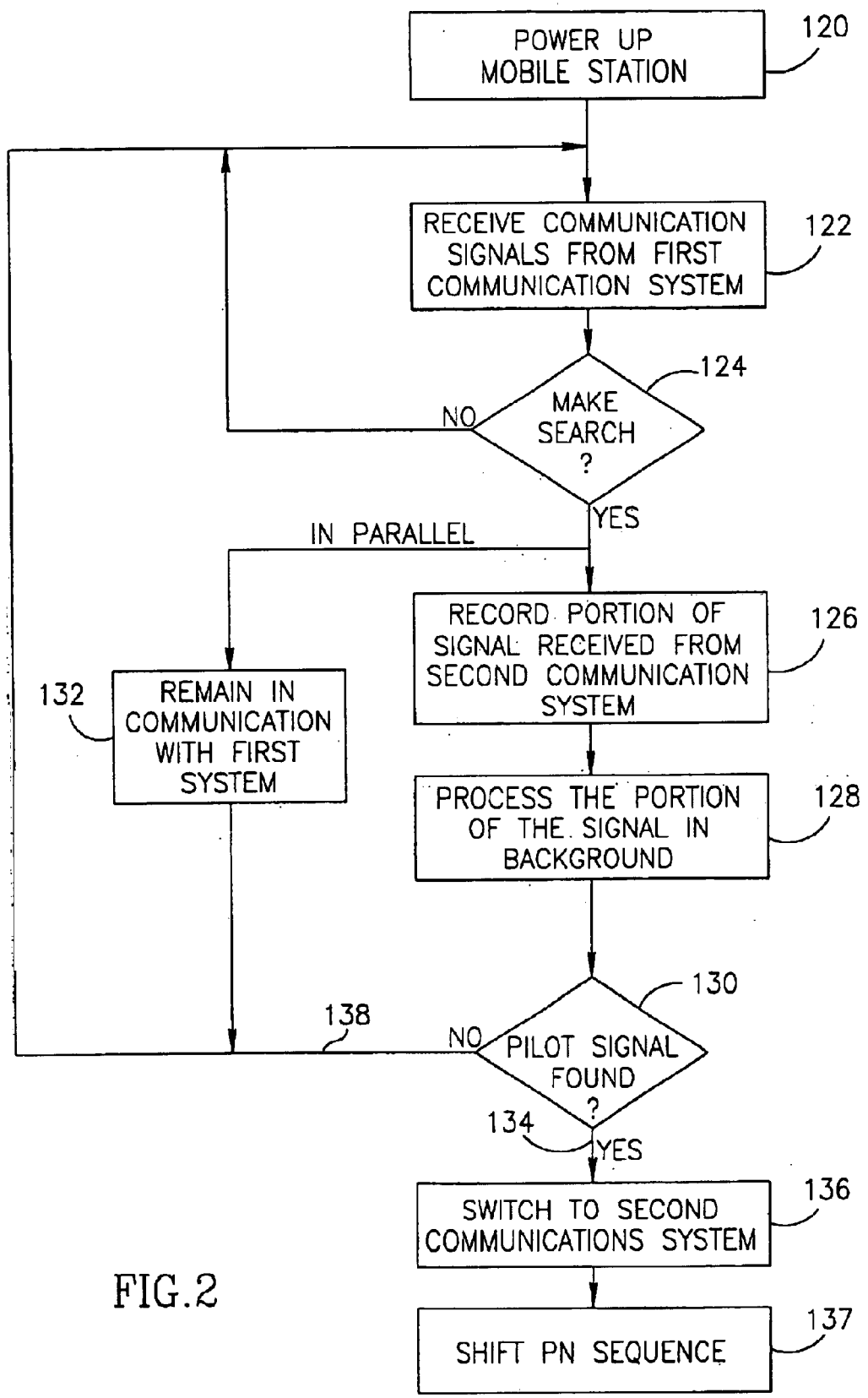
FIG. 2 is a flowchart illustration of a method for operating a dual-mode communications system, with a handoff from a first communications system to a second communications system, in accordance with an embodiment of the invention.

Reference is now additionally made to FIG. 2, which illustrates a method for searching for a pilot signal of the second communications system 110 while retaining the connection with the first communications system 106, in accordance with an embodiment of the invention.

Mobile station 102 is powered up (step 120) and may initially receive communication signals from the first communications system 106 (step 122). If the first communications system 106 is AMPS, for example, the communications signals received by mobile station 102 may comprise analog control channels (ACCs), which provide signaling and control information about de first communications system 106 in any one of 21 frequencies. It is appreciated that step 122 may comprise receiving communication signals from other kinds of communications systems, such as, but not limited to, CDMA, FDMA, TDMA or GSM.

Mobile station 102 may be in communication with the first communications system 106 as long as mobile station 102 is in the preferred receiving range of the base station 104 of the first communications system 106. During this time, signals may also be received from other communications sources, such as from the second communications system 110. Accordingly, it may be desired or require to search for communication signals from second communications system 110 (step 124).

In accordance with an embodiment of the invention, the searching may be carried out by first recording a portion of the signal received from the second communications system 110 (step 126) and background processing the portion of the signal, also referred to as offline processing (step 128), in order to acquire a communication channel at the second communication system 110. If the second communications system 110 uses CDMA, the processing may use known processing techniques to detect whether a CDMA pilot signal is found in the recorded portion of the signals (step 130).

Receiving and processing communications information, such as pilot signals, for example, of another communications system is also generally referred to as making "measurements" of the other communications system. In the case of CDMA, CDMA signals comprise a pseudo-noise (PN) sequence, which must be acquired in order to be in communication with the communications system that operates in CDMA. CDMA acquisition may comprise finding a correlation between the PN sequence of the recorded portion of CDMA signals and one of a plurality of known PN sequences.

In general, for any kind of communications system, the processing may include identifying the pilot signals that are receivable and selecting the base station of the second communications system 110 that has the strongest pilot channel. Steps 126, 128 and 130 may be performed while retaining the connection with the first communications system 106 (step 132). If a CDMA pilot signal is found and acquired (step 134), then mobile station 102 may be switched to receiving signals from the second communications system 110 (step 136), meaning that communication is handed off from the first communications system 106 to the second communications system 110. It is noted that if the first communications system were to be communicating in CDMA, then the PN sequence may be shifted (step 137) in the event that the CDMA acquisition determines that the PN should be shifted. If no CDMA pilot signal is found (step 138), then mobile station 102 may remain in communication with the first communications system 106.

The invention may be carried out as well for handing off from the second communications system 110 back to the first communications system 106 or to other communications systems.

Figure 5A:
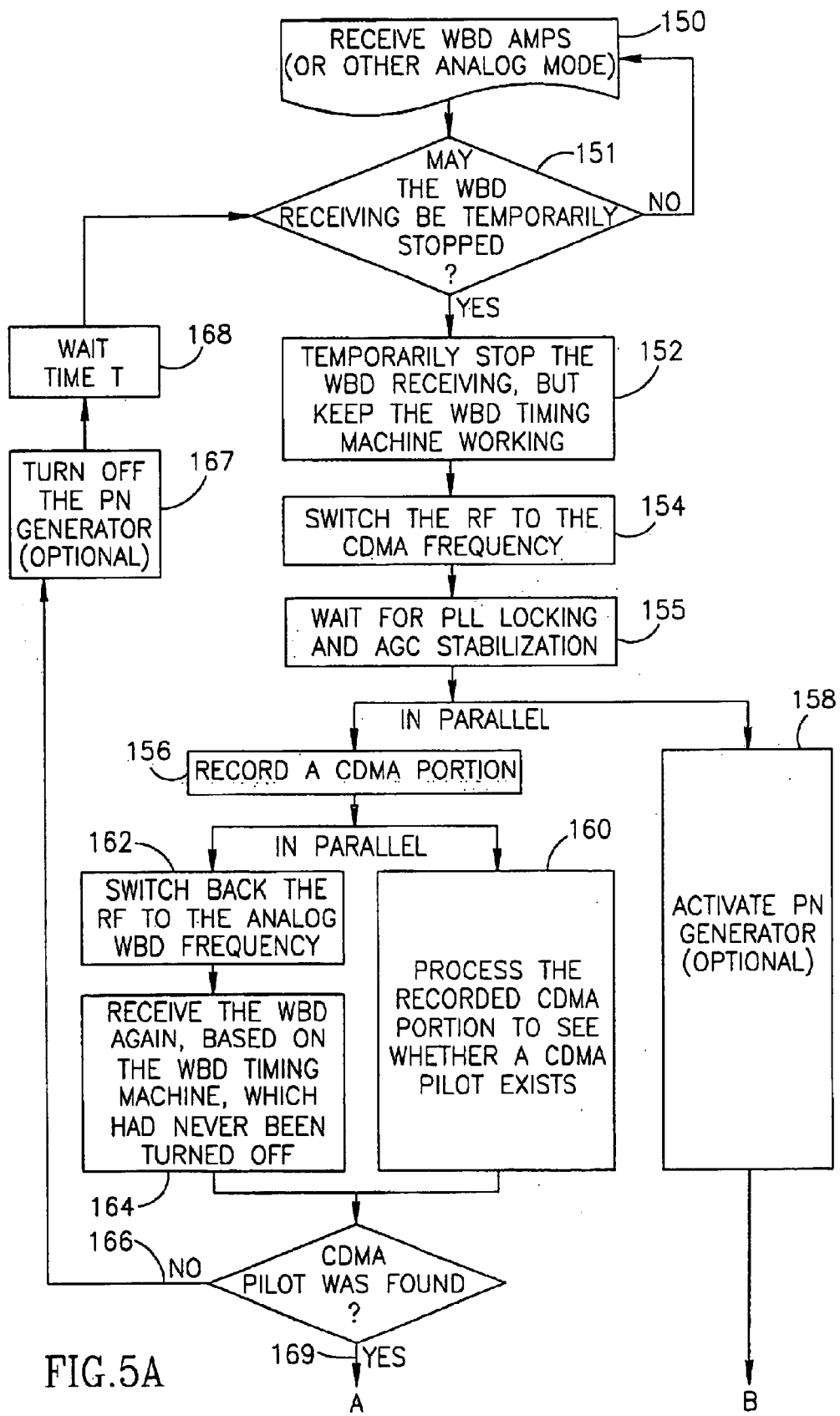
FIGS. 5A and 5B are a flowchart illustration of a method for handing off from AMPS to wide-band CDMA (W-CDMA) mode, according to an embodiment of the present invention.
Figure 5B:
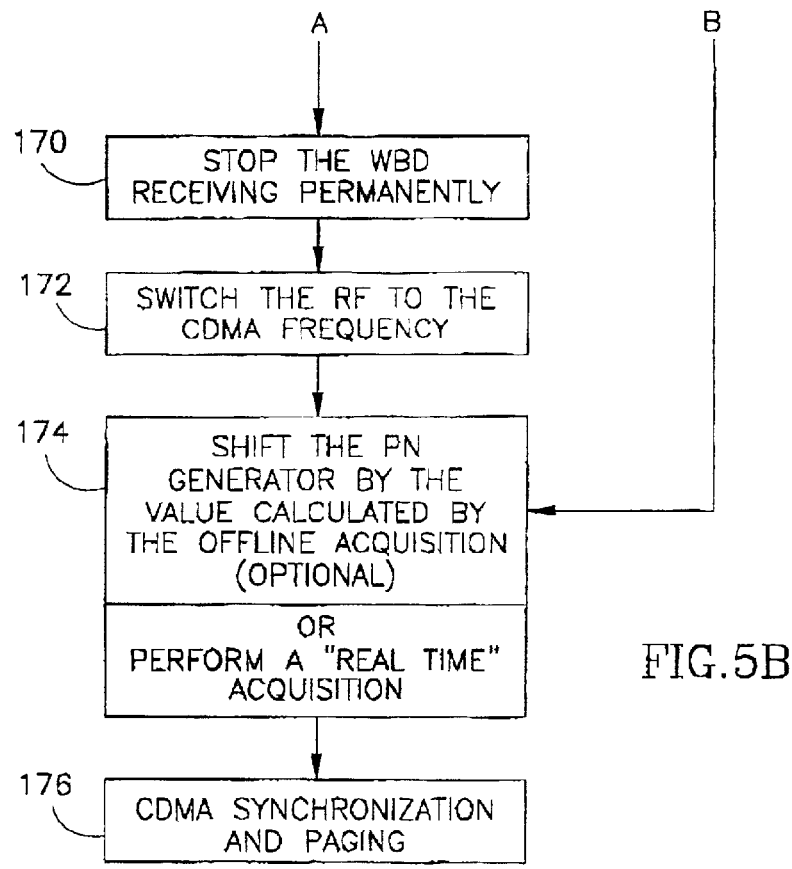

Reference is now made to FIGS. 5A and 5B, which are a flowchart illustration of a method for handing off from an analog (such as AMPS) communications system to a CDMA communications system, according to one embodiment of the present invention. In an analog communication system such as AMPS, wide-band (WBD) analog communications may be used to acquire an analog communications channel. The WBD may comprise repetitions of sub-frames in a data frame, with which may be associated a WBD timing machine, and the method of the invention may make advantageous use of these repetitions, as described hereinbelow with reference to FIG. 6.

In the illustrated embodiment of FIGS. 5A and 5B, after initially receiving wide-band AMPS, or any other analog mode (step 150), it may be desired or necessary to search for communication signals from another communications system that operates in CDMA, as similarly described in step 124 hereinabove. In the illustrated embodiment, receipt of the wide-band analog signals may be temporarily stopped (step 151), but the WBD timing machine may remain operating (step 152).

The RF may then be switched to the CDMA frequency (step 154), which may sometimes include waiting for a phase lock loop (PLL) to lock to the CDMA frequency and stabilizing AGC (step 155). A portion of the CDMA signal may be recorded (step 156), as similarly described hereinabove in step 126. Optionally, a PN generator may be substantially simultaneously activated (step 158), in parallel to recording the portion of the CDMA signal. The recorded portion of the signal may be processed to detect whether a CDMA pilot exists (step 160), as similarly described hereinabove in step 128. While the recorded portion of the signal is processed, the RF may be switched back to the analog WBD frequency (step 162), and the WBD may be received again in accordance with the WBD timing machine, which has not been turned off (step 164).

If no CDMA pilot is found (step 166), the PN generator may be turned off (step 167), and after a predetermined period of time T (step 168) the process may return to step 151. If a CDMA pilot is found (step 169), then the WBD receipt may be permanently stopped (step 170), and the RF may be switched to the CDMA frequency (step 172). The PN generator may then be shifted by the amount calculated by the background processing, or alternatively, a real time acquisition may be performed (step 174). CDMA synchronization and paging may then be performed (step 176).

Figure 6:
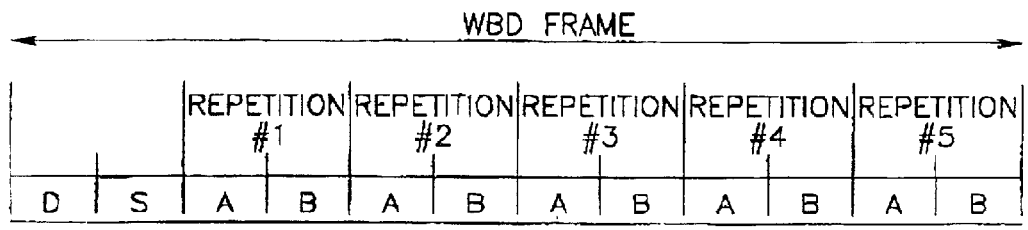
FIG. 6 is a schematic illustration of the wide-band frame structure, helpful in understanding the present invention.

Reference is now made to FIG. 6. As mentioned hereinabove, wide-band analog may comprise repetitions of sub-frames in a data frame. For example, after receiving sub-frames D and S, there may be five (5) consecutive repetitions of sub-frames A and B. A dual-mode mobile transceiver may decide which data was sent by a base station based upon the repetitive sub-frames. If t he mobile transceiver recognizes the data pattern after a few repetitions, the mobile transceiver may not need to analyze the remaining repetitions. In such a case, in one embodiment of the invention, step 151 (deciding to temporarily stop receipt of the wide-band analog signals), step 154 (etching to the CDMA frequency) and step 156 (recording the portion of the CDMA signal) may be initiated or perhaps at least partially completed during the time allotted for the "unused repetitions". In some cases, already after receiving the first frame, it may be apparent that the current message is not destined for the mobile transceiver. In those cases, there may also be an "unused" period of time for recording the portion of the CDMA signal.

Figure 3:
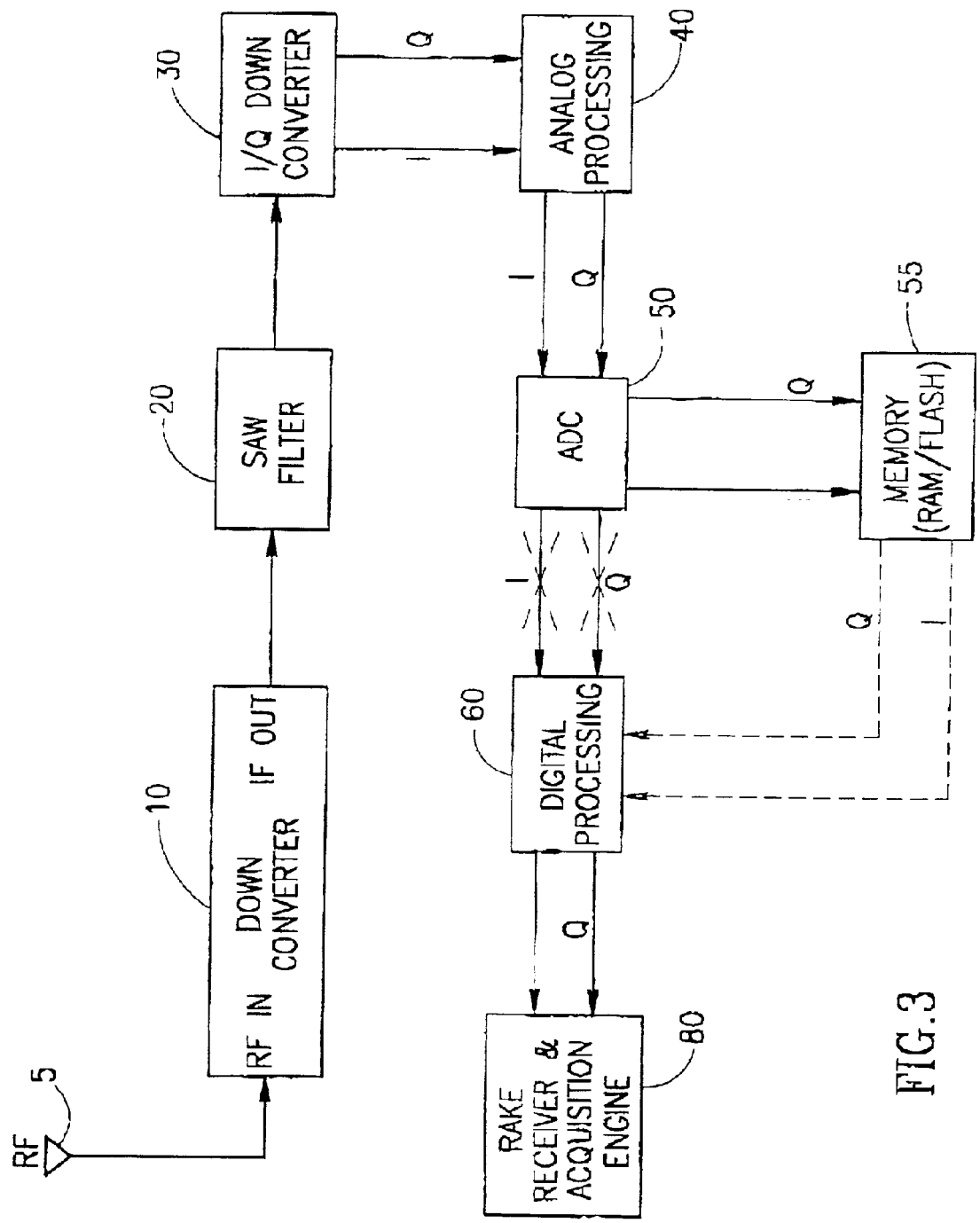
FIG. 3 is a schematic illustration of a receive path of a dual-mode communications system, according to an embodiment of the present invention.

A receive path that may be used by mobile station 102 is now described with reference to FIG. 3. The receive path comprises, without limitation, a down converter 10, also called a baseband module, which may receive RF signals from an antenna 5. Down converter 10 may output an intermediate frequency (IF) signal to a saw filter 20, which may be connected to an in-phase/quadrature (I/Q) down converter 30. The output of I/Q down converter 30 may be sent to an analog processing unit 40, which in turn may output to a digital processing unit 60 via an analog-to-digital converter (ADC) 50. Digital processing unit 60 may output to a rake receiver and acquisition engine 80, which may serve as an offline processing unit for offline processing (also called background processing) of a portion of the received signal, as is described hereinbelow. The elements of the receive path, excluding down converter 10, are also referred to collectively or singly as radio frequency (RF) modules. The analog processing unit 40, digital processing unit 60 and rake receiver and acquisition engine 80 are also referred to collectively or singly as a searcher, processor or processing unit. The processor may use processing techniques well known in the art to identify the pilot signals that are receivable and select the base station with the strongest pilot channel.

In the illustrated embodiment, a portion of a received signal may be recorded at the output of ADC 50. The portion of the received signal may be stored in a memory 55 such as, but not limited to, a read-access memory (RAM) or flash memory. In this embodiment, the power consumption may be improved by turning off both digital processing unit 60 and the rake receiver and acquisition engine 80 while recording the portion of the received signal.

Figure 4:
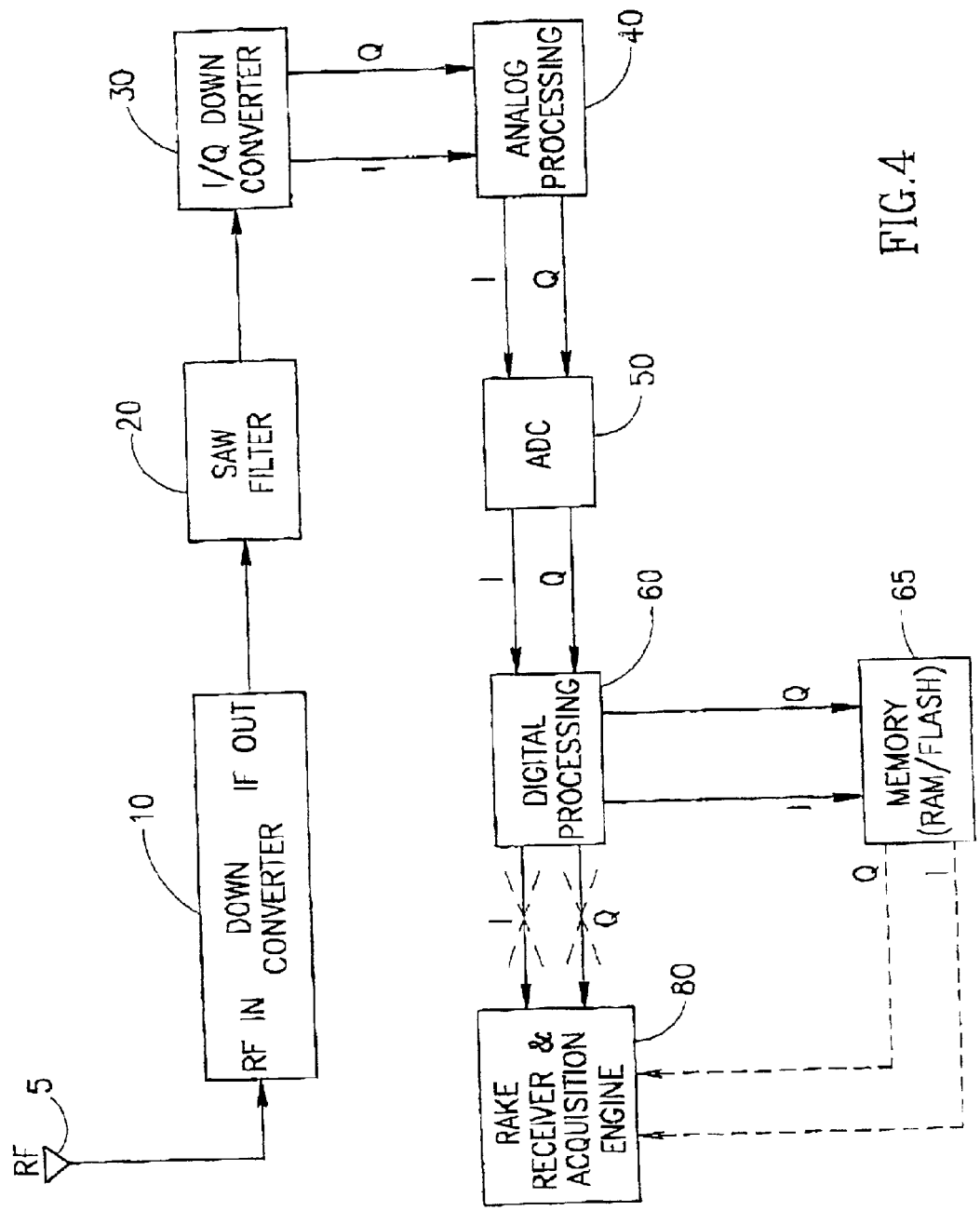
FIG. 4 is a schematic illustration of a receive path of a dual-mode communications system, according to another embodiment of the present invention.

According to another embodiment of the present invention, the portion of the signal may be recorded between the digital processing output and the rake receiver input, as shown in FIG. 4, to which reference is now made. The portion of the received signal may be recorded in a memory 65 such as, but not limited to, a read-access memory (RAM) or flash memory. In this embodiment, the power consumption may be improved by turning off rake receiver and acquisition engine 80 while recording the portion of the received signal. In one embodiment of the invention, analog processing unit 40 may comprise, without limitation, analog filtering, a direct-current (DC) remover, and automatic gain control (AGC), or any other suitable analog processing circuitry (all not shown). Digital processing unit 60 may comprise, without limitation, digital filtering, interpolating, or any other suitable digital processing circuitry (all not shown). Digital processing unit 60, for example, may be a digital signal processor.

The invention may be used advantageously in handing off to or from a wide-band CDMA (W-CDMA) communications system in a dual-mode communications system, as is now described with reference to FIGS. 7 and 8.

Figure 7:
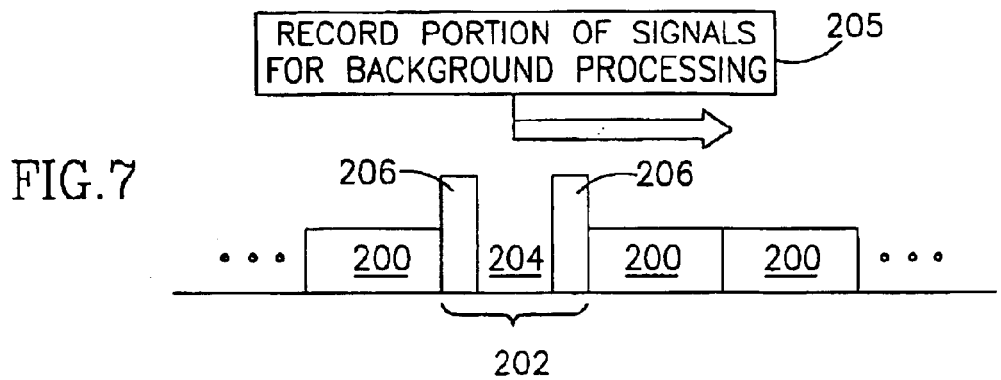
FIG. 7 is a schematic illustration of a compressed mode of operation for WB-CDMA, according to an embodiment of the present invention.
Figure 8:
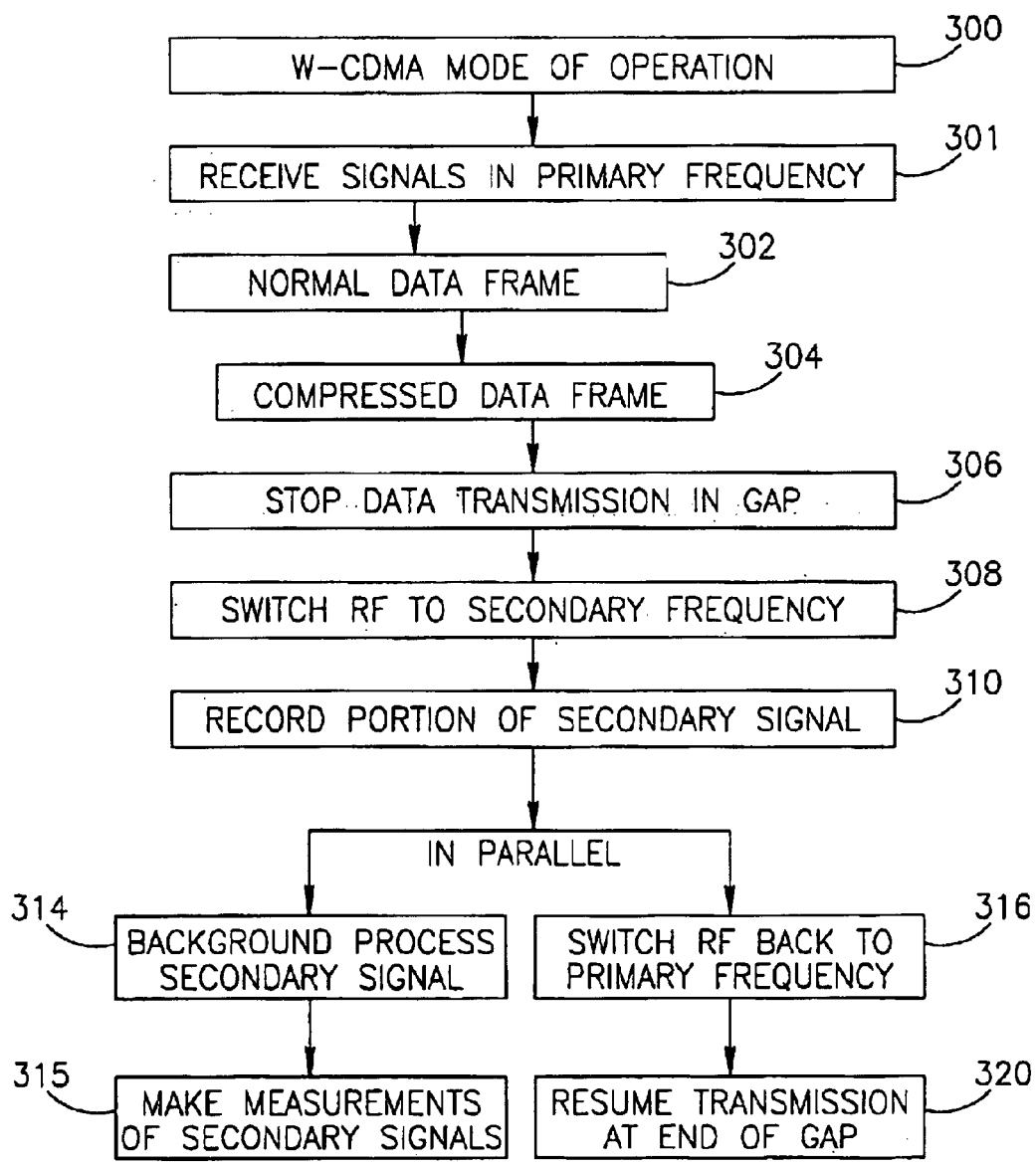
FIG. 8 is a flowchart illustration of a method for making measurements of communications systems with background processing, particularly useful in WB-CDMA, according to an embodiment of the present invention.

Reference is made to FIG. 7, which illustrates a compressed mode of operation for W-CDMA. The compressed mode enables execution of communications systems measurements without affecting the current performance of data transfer in uplink and downlink.

The compressed mode refers to compressing communications data, which are normally communicated in a normal data frame 200, into a compressed data frame 202, which comprises a period 204, variously referred to as the "in gap", "transmission gap" or simply "gap", in which there is no reception and transmission, and one or more periods 206, called the "out gap", in which the data is transferred. Since data is transferred in a shorter period of time in the out gap 206 than in the normal data frame 200, the data is transferred at a higher rate, or less data is transferred. In the prior art, the gap period 204 is used for making measurements of communications systems with online processing. In the present invention, the gap period 204 enables recording a portion of signals for making measurements of communications systems with background processing 205, as is described with reference to FIG. 8.

A dual mode transceiver, such as mobile station 102 of FIG. 1, may be in a W-CDMA mode of operation (step 300). The transceiver may receive signals in a primary frequency (step 301) in the normal data frame 200 (step 302), and in the compressed data frame 202 (step 304). In the compressed data frame 202, the data transmission may be temporarily stopped in the gap 204 (step 306). The RF may then be switched to some secondary frequency (step 308), which may include changing the RF PLL to the secondary frequency and performing AGC. A portion of the secondary signal may be recorded during at least a portion of the gap period 204 (step 310), such as in memory 55 or 65, as described hereinabove with reference to FIGS. 3 and 4, respectively.

The recorded portion of the secondary signal way then be background processed (step 314), as described hereinabove, in order to make the measurements of the secondary signals (step 315). In parallel to the background processing, after recording the portion of the secondary signal, the RF may be switched back to the primary frequency (step 316), which may comprise changing the RF PLL back to the primary frequency and performing AGC. Transmission may then be resumed at the end of the gap 204 (step 320).

The background processing ay be done faster than online processing used in W-CDMA prior art. In addition, the processing may also be done during out gap 206 in the background, along with other tasks of the mobile station. This may reduce the number of gaps 204 that the prior art uses for the same number of measurements. Additionally or alternatively, the background processing may reduce the computing power or number of processors that the prior art uses for the same number of measurements.

It will be appreciated by persons skilled in the art that the present invention is not limited by what has been particularly shown and described herein above. Rather the scope of the invention is defined by the claims that follow:

What is claimed is:

1. A method comprising: interrupting reception from a first communications system;
   receiving signals from a second communications system that operates according to a different communication standard than said first communication system;
   resuming reception from said first communications system; and
   searching for a pilot signal of said second communications system by background processing at least a portion of said received signals.

2. The method according to claim 1 comprising
   recording online at least said portion of said received signals.

3. The method according to claim 1 wherein said portion of signals is a portion of spread spectrum signals.

4. The method according to claim 1 wherein said background processing comprises performing Code Division Multiple Access (CDMA) acquisition.

5. The method according to claim 1 wherein said portion of signals is a portion of CDMA signals, and said first and second communications systems are transmitting on different frequencies.

6. The method according to claim 5 comprising recording said portion of CDMA signals after converting said portion of CDMA signals from an analog signal to a digital signal.

7. The method according to claim 5 comprising recording said portion of CDMA signals after digitally processing said portion of CDMA signals.

8. The method according to claim 4 wherein performing said CDMA acquisition comprises finding a correlation between a pseudo-noise (PN) sequence of said portion of spread spectrum signals and one of a plurality of known PN sequences.

9. The method according to claim 8, further comprising shifting said PN sequence of said portion of spread spectrum signals.

10. The method according to claim 1 wherein said first communications system operates in a compressed mode of communication, and interrupting said reception comprises interrupting said reception during a gap period.

11. The method according to claim 1 wherein communication signals from said first communications system comprise repetitions of sub-frames in a data frame, and interrupting said reception comprises;
    interrupting said reception during at least one repetition of at least one said sub-frame in at least one said data frame.

12. A dual mode receiver comprising: a processor to interrupt reception from a first communications system, to receive signals from a second communications system that operates according to a different communication standard than said first communication system, to resume reception from said first communication system, and to search for pilot signal of said second communications system by background processing at least a portion of said received signals.

13. The receiver according to claim 12 further comprising: a memory to record online a at least said portion of said received signals for said background processing.

14. The receiver according to claim 12 wherein said portion of signals comprises a portion of spread spectrum signals.

15. The receiver according to claim 12 wherein said portion of signals comprises a portion of CDMA signals.

16. The receiver according to claim 15 wherein said portion of CDMA signals comprises a PN sequence.

17. The receiver according to claim 16 wherein said processor is able to perform CDMA acquisition by processing said portion of CDMA signals off-line.

18. The receiver according to claim 17 wherein said processor is able to find a correlation between said PN sequence and one of a plurality of known PN sequences.

19. The receiver according to claim 12 wherein said first and second systems comprise at least one of CDMA, Advanced Mobile Phone Service (AMPS), Frequency Division Multiple Access (FDMA), Time Division Multiple Access (TDMA), and Global System for Mobile communication (GSM) communications systems.

* * * * *